July 3, 1962 P. B. ZEIGLER 3,042,372
POWERED JACK SCREW ASSEMBLY
Filed May 27, 1960 2 Sheets-Sheet 1

INVENTOR.
Philip B. Zeigler
BY
Bryce Beecher
ATTORNEY

July 3, 1962 P. B. ZEIGLER 3,042,372
POWERED JACK SCREW ASSEMBLY
Filed May 27, 1960 2 Sheets-Sheet 2

INVENTOR.
Philip B. Zeigler
BY Bryce Beecher
ATTORNEY

United States Patent Office 3,042,372
Patented July 3, 1962

3,042,372
POWERED JACK SCREW ASSEMBLY
Philip B. Zeigler, Saginaw, Mich., assignor to General Motors Corporation, Detroit, Mich., a corporation of Delaware
Filed May 27, 1960, Ser. No. 32,428
2 Claims. (Cl. 254—7)

This invention relates to a powered jack screw assembly particularly adapted for use in elevator mechanisms but having other utility.

A primary object of the invention is to provide a mechanism of the indicated category which combines high load-carrying capacity with high efficiency. Another object is to provide a mechanism of this type in which the screw component is maintained stationary. Still another object is to provide a powered jack screw assembly incorporating means whereby the motion of the load-bearing member is automatically arrested whenever the application of power is stopped.

Through the use of a stationary screw, the invention eliminates the whip apparent in long, rotating screws and the noise caused by such whipping.

The invention will be particularly described with the aid of the accompanying drawings illustrating a preferred embodiment thereof and in which.

Figure 1:
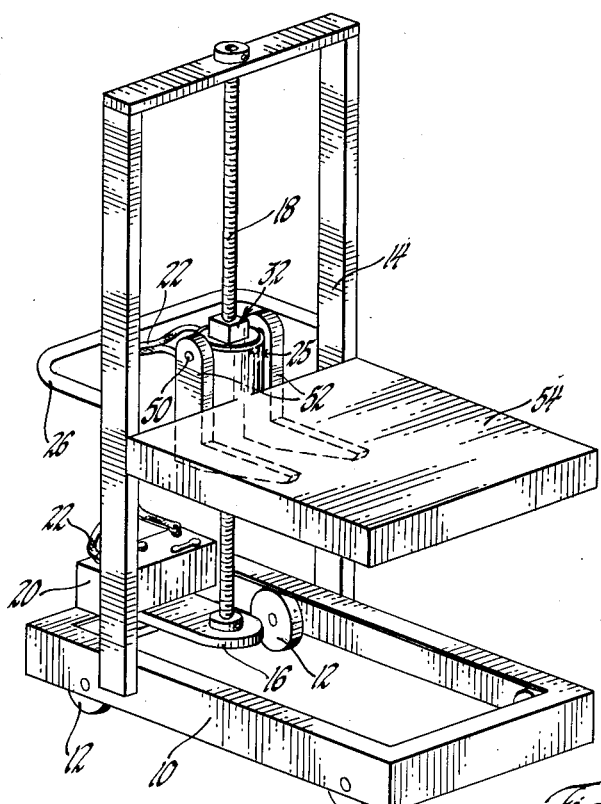
FIGURE 1 is a perspective view of a lift truck incorporating the invention.

Referring first to FIGURE 1, the numeral 10 denotes a rectangular base mounting wheels 12 and carrying a frame member 14. Secured to the frame member 14 and to a shelf 16, supported by the base 10, is a stationary screw 18.

A battery 20 having cables 22 extending therefrom is supported by the shelf 16. These cables are of a length set by the maximum distance travelled by the power unit 25 on the screw. Handle bar 26 serves an obvious purpose.

Unit 25 incorporates (FIG. 3) a reversible D.C. motor 30 and a ball nut 32 which is threadingly connected to the tubular shaft 34 of the armature 35, the connection being made secure by a lock washer 36 keyed to the shaft. With this arrangement, the armature and ball nut rotate as one.

Ball nut 32 is of generally conventional design. Thus, the same comprises a return tube 38 for recirculation of the balls 40 providing the connection between the ball nut and the screw 18. The tubular shaft 34, like the ball nut, envelopes the screw 18 but does not have a ball connection therewith.

Figure 2:
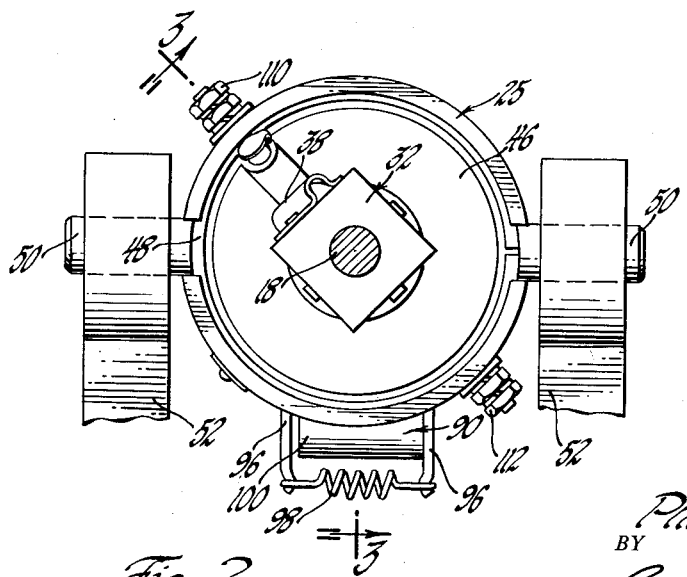
FIGURE 2 is an end view of the power unit.
Figure 4:
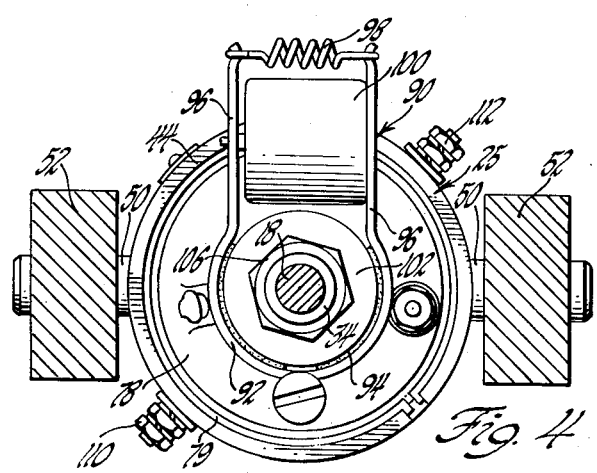
FIGURE 4 shows the end of the power unit opposite the end shown by FIG. 2.

The motor housing 44 includes an end plate 46 secured by a snap ring 48 and mounts trunnions 50 (FIGS. 2 and 4) for brackets 52 through which the platform 54 (FIG. 1) is supported.

Figure 3:
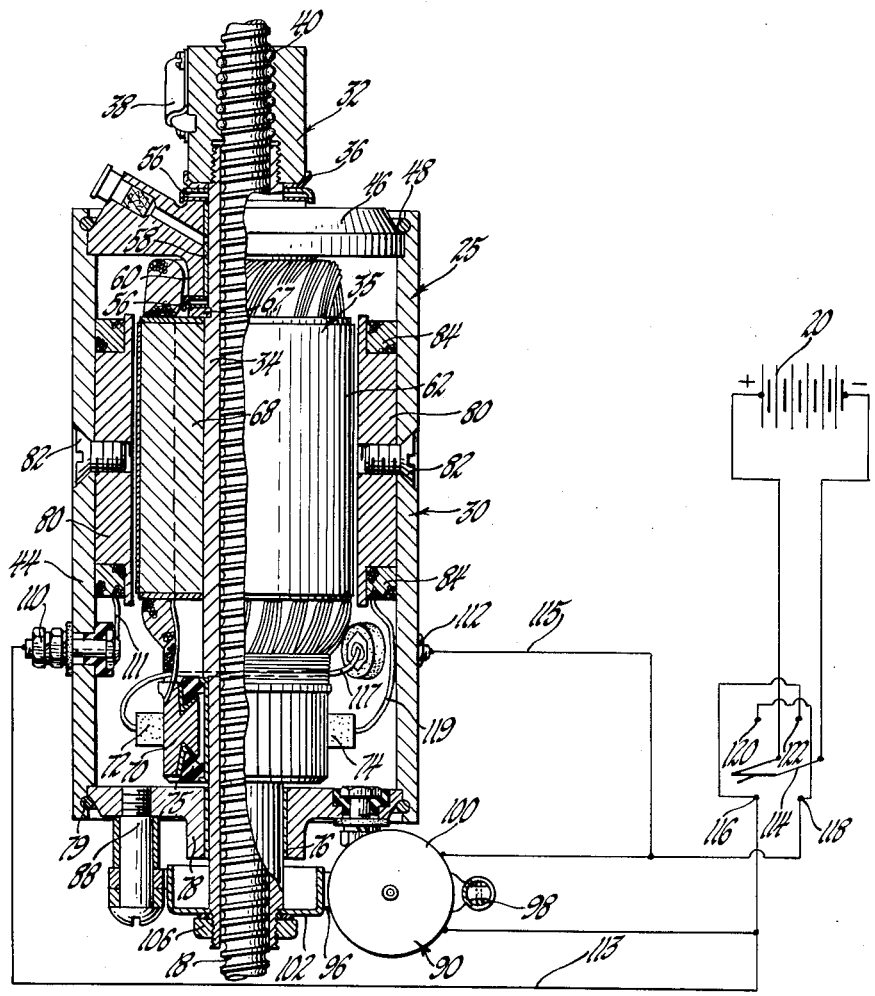
FIGURE 3 is a view on the line 3—3 in FIG. 2 with the required circuitry shown diagrammatically.

Reverting to FIGURE 3, thrust bearings 56 will be seen at either end of a bushing 58 in which the armature shaft 34 rotates. Such bushing finds support in the cover plate 46 which is bossed at 60 to fully accommodate the bushing. Within the armature cover 62 is a ring piece 67 received in an annular groove in the armature shaft and spacing the inner thrust bearing 56 from the body 68 of the armature.

The armature is of conventional design and, hence, need not be described here with any particularity. Suffice it to say that the windings thereof are connected to the commutator segments 70 which have contact with brushes 72 and 74. The commutator includes a carrier 75 fixed to the shaft 34 and having a dovetail connection with each segment. Outward of the commutator the armature shaft turns in a bushing 76 supported by cover plate 78. This plate is secured in the manner of plate 46 by a snap ring 79.

The armature will be seen surrounded by the usual pole pieces 80 secured to the motor housing by screws 82 and having end recesses for the accommodation of field windings 84.

Outward of the cover plate 78 and secured thereto by a bolt 88 is a friction brake mechanism 90. Such mechanism comprises a band 92 carrying shoes 94 and having integral legs 96. A solenoid 100 having a separate mounting on the end plate 78 is disposed between the legs 96 with its armature operably connected to one of the legs. When the solenoid is energized it acts to spread the legs 96 to release the brake against the resistance of spring 98. This spring normally maintains the shoes 94 in braking engagement with the drum 102 which is held fast to the armature shaft 34 by means of a nut 106 threaded on such shaft.

The motor housing 44 will be seen as mounting terminals 110 and 112. Terminal 110 has connection with one of the leads (111) from the field winding 84, while terminal 112 electrically connects via lead 117 with the brush 72. The second lead 119 of the field winding 84 extends to the brush 74.

The power from the battery 20 is under the control of a double-pole, double-throw switch 114. Contacts 116 and 118 in the switch assembly have connected thereto the leads 113 and 115 from the terminal 110 and the terminal 112, respectively.

In addition to the contacts 116 and 118, the switch assembly incorporates contacts 120 and 122 circuited with respect to the contacts 116 and 118 as necessary to reverse the rotation of the motor armature.

To describe now the operation of the illustrated apparatus, let it be assumed that the lift truck (FIG. 1) is at rest. Under this condition the friction brake 90 is in an energized state by force of spring 98. To elevate the platform 54, switch 114 is thrown as necessary to cause counterclockwise rotation of the motor armature and ball nut on the screw. The mere closing of the switch, with the circuitry as shown, energizes the solenoid 100 which de-energizes the friction brake. Once the platform has arrived at the desired level, the switch 114 is opened to de-energize the motor and solenoid. The de-energization of the solenoid brings about the energization of the friction brake, spring 98 acting to tighten the shoes 94 about the drum 102, and descent of the platform by force of gravity is prevented. Restoration of the platform to its initial position is accomplished by throwing the switch 114 to its closed position marked by clockwise rotation of the ball nut and motor armature on the screw.

I claim:

1. A powered jack screw device comprising a frame member, a stationary screw supported in vertical disposition by said frame member, an electric motor assembly surrounding said screw, said assembly including a housing provided with means for supporting a work load and having end plates, the armature of said motor incorporating a tubular shaft enveloping said screw and journalled in said plates, a ball nut secured to said tubular shaft outward of one of said plates, a friction brake mechanism for said shaft outward of the other of said plates, said brake mechanism being normally maintained energized by spring means associated therewith, and electro-mechanical means carried by said housing and in circuit with said motor whereby upon energization of the motor circuit said brake is automatically de-energized.

2. A powered jack screw device as defined by claim 1 where said frame member is provided with wheels and is adapted to carry a battery supplying power to said circuit.

References Cited in the file of this patent
UNITED STATES PATENTS

| | | |
|---|---|---|
| 733,614 | Ball | July 14, 1903 |
| 1,178,115 | Wheeler | Apr. 4, 1916 |
| 1,279,346 | Hultgren et al. | Sept. 17, 1918 |
| 2,444,886 | Vickers | July 6, 1948 |
| 2,756,964 | Hogan | July 31, 1956 |